United States Patent [19]

Hofmann

[11] Patent Number: 4,606,655

[45] Date of Patent: Aug. 19, 1986

[54] ROLLER BEARING

[75] Inventor: Heinrich Hofmann, Schweinfurt, Fed. Rep. of Germany

[73] Assignee: FAG Kugelfischer Georg Schafer (KGaA), Fed. Rep. of Germany

[21] Appl. No.: 524,125

[22] Filed: Aug. 16, 1983

[30] Foreign Application Priority Data

Aug. 21, 1982 [DE] Fed. Rep. of Germany ....... 3231138

[51] Int. Cl.$^4$ ...................... F16L 35/077; F16L 43/04
[52] U.S. Cl. ..................................... 384/458; 384/510
[58] Field of Search ............... 308/179.5, 189 R, 191, 308/192, 207 R, 210, 216, 236, 189 A; 29/148.4 R, 148.4 A, 148.4 B, 149.5 R; 384/458, 510

[56] References Cited

U.S. PATENT DOCUMENTS

| 2,779,641 | 1/1957 | Sutowski | 308/236 X |
| 3,167,364 | 1/1965 | Dunn | 308/189 R |
| 3,943,803 | 3/1976 | Hafla | 308/189 A X |
| 4,244,630 | 1/1981 | Tischer | 308/189 R |
| 4,406,504 | 9/1983 | Coenen et al. | 308/189 R X |

FOREIGN PATENT DOCUMENTS 2008385 9/1971 Fed. Rep. of Germany .

Primary Examiner—Stuart S. Levy
Assistant Examiner—David Werner
Attorney, Agent, or Firm—Ostrolenk, Faber, Gerb & Soffen

[57] ABSTRACT

In a bearing structure in a housing and around a shaft and comprising a pair of bearings, there is a pair of axially spaced inner races on the shaft, and a respective outer ring in the housing defining the outer race of each bearing. A stepped diameter bushing in the housing has a larger and a smaller diameter section. The outer ring for the first of the bearings is supported within the larger diameter section of the stepped bushing. The outer surface of the larger diameter bushing section fits in the housing for the bearing structure. The second of the bearings is contacted by the end of the smaller diameter section of the bushing. The assembled bearing and shaft unit is in the housing with the larger diameter portion of the stepped bushing bearing against the interior of the housing. An intermediate bushing may be provided around the outer ring of the second bearing at the smaller diameter section of the stepped bushing and the intermediate bushing fitting in the housing. The second bearing may be integrated with the stepped bushing by a snap arrangement between the bushing and the outer ring for the second bearing.

14 Claims, 4 Drawing Figures

ROLLER BEARING

BACKGROUND OF THE INVENTION

1. Field of the Invention

The present invention relates to roller bearings, and particularly to a roller bearing in which the installation of two spaced rows of anti-friction members like ball bearings is facilitated, particularly by the use of a stepped bushing of high load bearing capacity and in which the introduction of the bushing and the spaced bearings into the housing for the roller bearing and the removal of the bushing therefrom are obtained without damaging the inner parts of the composite bearing even if substantial forces are applied.

2. Description of the Prior Art

Bearings having spaced ball races with a bushing in between are known. See, for instance, German Application OS 20 08 385 wherein the bushing is arranged between outer rings. A single structural unit is obtained. On the other hand, the actual distance between the outer rings is fixed. Assembly and disassembly of the unit can be effected without damaging the bearing parts. However, on the mounting of the ball bearings, the bushing becomes more of a hindrance than an advantage. The mounting of the first bearing on the shaft could be effected in a relatively simple manner since the bushing could be omitted at that time. However, before the mounting of the second bearing, the bushing must be installed. Since it is desired to provide the greatest possible number of balls in the bearing for a high load bearing capacity, for loading the second bearing, it is necessary to displace the shaft to make it eccentric to the outer ring to permit an adequate quantity of the bearing balls to be introduced into the crescent-shaped space which is opened when the shaft is displaced. However, once the bushing has been installed, the required eccentric displacement of the shaft with respect to the outer ring of the bearing may, however, no longer be possible. See in this regard, U.S. Application Ser. No. 491,889, filed May 5, 1983 now U.S. Pat. No. 4,508,397, which shows one technique of providing a crescent-shaped space.

SUMMARY OF THE INVENTION

In the present invention, a bearing structure is disposed around a shaft inside a housing. The bearing structure comprises two spaced apart bearings on the shaft which support the shaft in the housing. One ball race of each bearing is on the shaft and the other race is in an outer ring of its bearing.

The present invention employs a novel bushing located between the outer rings of the bearings. The stepped bushing is preferably of plastic and has a large diameter section surrounding the outer ring of the anti-friction bearing which is last to be mounted and a small diameter section extending up to the axially inward face of the outer ring of the anti-friction bearing which is first to be mounted. The large diameter section of the bushing is received inside the housing.

An additional or intermediate bushing may be used to hold the outer ring of the first mounted bearing in the housing.

With the invention, the bearing structure including the stepped bushing can be assembled before it is installed in the housing. Despite the simple installation of the bearing elements in both of the bearings on the shaft, the introduction of the entire assembled bearing structure in the housing and its subsequent removal are obtainable without damaging inner parts of the bearing, even if substantial forces are applied.

The stepped bushing bridges the distance between the outer rings of the two bearings, and its smaller diameter end engages the side of the bearing which is last mounted. As a result, assembly or disassembly forces can be exerted on one of the outer rings without the bearing parts being subject to an impermissibly high load. Furthermore, radial shifting of the two races of the bearing to be last mounted, for temporarily making the shaft eccentric to the outer ring, is possible because both of the outer rings are not surrounded by this bushing. As a result, a very large number of balls can be placed in both bearings, thereby increasing the load carrying capacity.

A slot or gap exists between the axially inward base of the inner friction bearing which is mounted last and the axial outward surface of the radial step of the stepped bushing. It is no longer necessary to make the axial dimensions of the parts extremely precise, since deviations can be compensated for upon the installation of the bearing structure as a result of the axial gap between the stepped housing and the outer ring. Expense is thereby saved, in particular, in the manufacture of the stepped bushing. As a result, it is further possible when using an unlipped or shoulderless outer ring inside the larger diameter section of the stepped bushing to put that bearing outer ring into the region of the gap inside the stepped bushing upon the introduction of the anti-friction members or balls. In this way, the number of anti-friction members can be further increased. Furthermore, a compression spring can be provided in the gap inside the stepped bushing for pushing the outer ring which is in the gap back into position above the inner race on the shaft after loading of the anti-friction members.

Between the large diameter section of the stepped bushing and the housing, there is preferably provided a cut back which is greater than the clearance between the inside diameter and the outer ring of the friction bearing. This means that the housing extends outward axially less than the stepped bushing and the associated bearing outer ring. In this way, axial displacement of the outer ring with respect to the stepped bushing is initially possible, thereby facilitating assembly. In the installed condition, however, sufficient axial locking of all parts is nevertheless achieved. This locking can be further increased by providing the outer surface of the outer ring of that bearing with teeth over at least part of its length. Upon assembly, these teeth engage the stepped bushing and thus produce a locking attachment against axial movement.

In order that the anti-friction members or ball bearings not fall into the inaccessible inner space upon assembly, as assembly usually is accomplished with the shaft arranged vertically, the stepped bushing may include a radially inward and axially outwardly directed segment having a section forming a partial ring shape extending axially up to approximately the area which defines the race for the antifriction members.

Between the small diameter section of the stepped bushing and the outer ring of the first anti-friction bearing, a snap fastening may be provided. It preferably comprises a resilient projection on the stepped bushing which engages a cooperating groove in the outer ring.

In this way, a single structural unit is obtained in preassembled condition.

In order to facilitate the installation and positioning of the bearing to be mounted first in the housing, an intermediate bushing may be provided between the outer ring of that bearing and the bore of the housing. The intermediate bushing, as well as the stepped bushing, can have a radially directed flange on its respective axially outer end. In that way, the axial positions of the parts with respect to the housing can be better established and retained.

BRIEF DESCRIPTION OF THE DRAWINGS

The foregoing and other objects and features of the present invention will become apparent from the following desription and accompanying drawings in which.

DETAILED DESCRIPTION OF THE PREFERRED EMBODIMENTS

Figure 1:
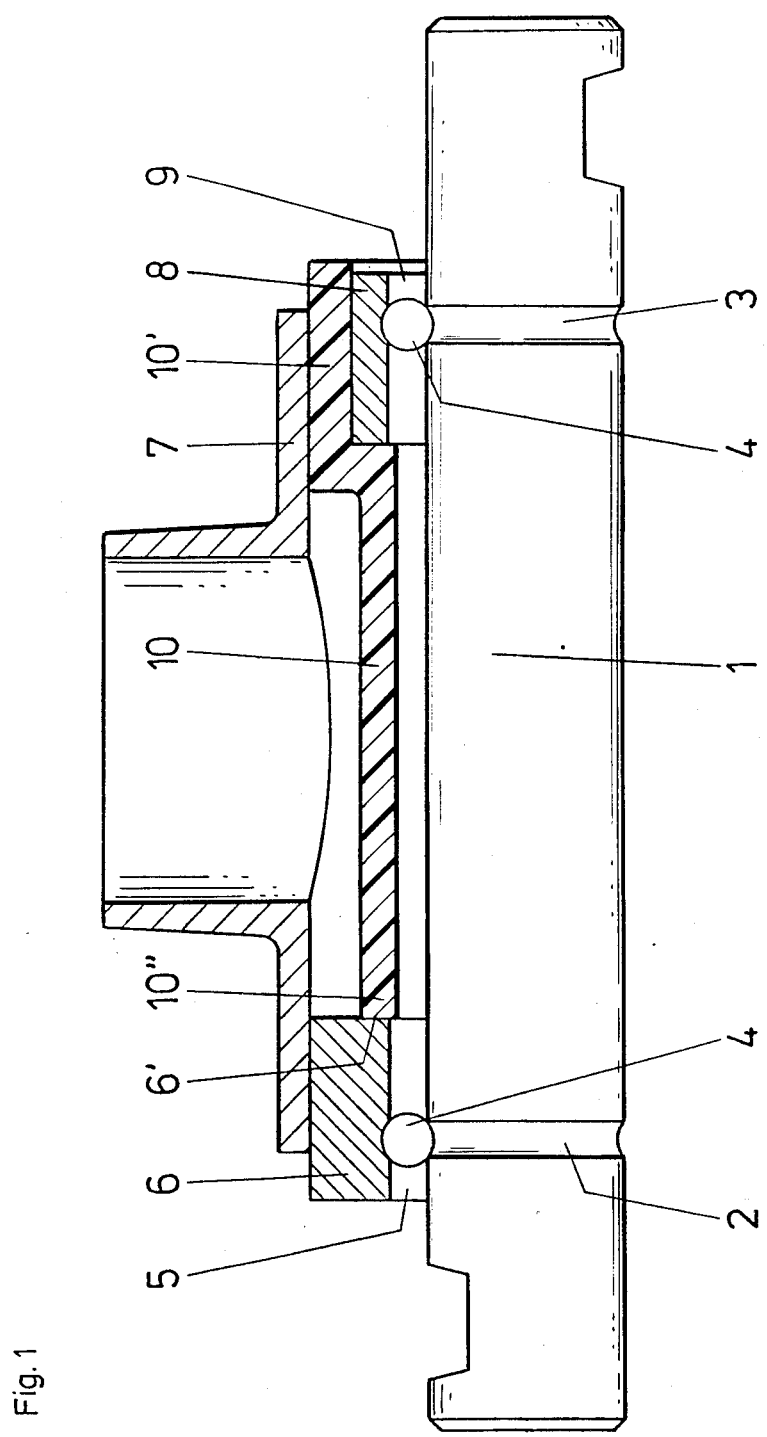
FIG. 1 is a partial, cross-sectional view through a bicycle bottom bracket bearing having a bearing and bearing support in accordance with the present invention.

Referring to FIG. 1, only one-half the bearing can be seen. The bearing wraps about the shaft 1. The shaft 1 is provided with a pair of axially spaced ball races 2 and 3 for the bearing balls 4. The anti-friction bearing 5 at the left in FIG. 1 is to be mounted first in the housing 7 of the bracket. The outer ring 6 of the bearing, which provides the outer race for the balls, is seated directly in the bore of the housing 7. The anti-friction bearing 9 at the right in FIG. 1 is to be mounted last. It has an outer ring 8 which is the outer race for the balls of that bearing.

There is a stepped bushing 10. the end thereof at the right has a larger diameter section with both a larger outer diameter for seating in the bore of the housing 7 and a larger inner diameter for receiving in it the outer ring 8 of the anti-friction bearing 9 after the bushing 10 is inserted. The ring 8 is surrounded by the larger diameter section 10' of the bushing 10.

The smaller diameter section 10" of the stepped bushing 1 bears against the inwardly facing axial side of the bearing 6, which is the first bearing to be mounted. The section 10" has a radial clearance at both radial sides within the housing 7 at the area where the bearing 6 is mounted. The end 10" of the bushing 10 is maintained in position when the larger diameter end section 10' at the opposite end of the bushing 10 is fully positioned within the housing 7.

Figure 2:
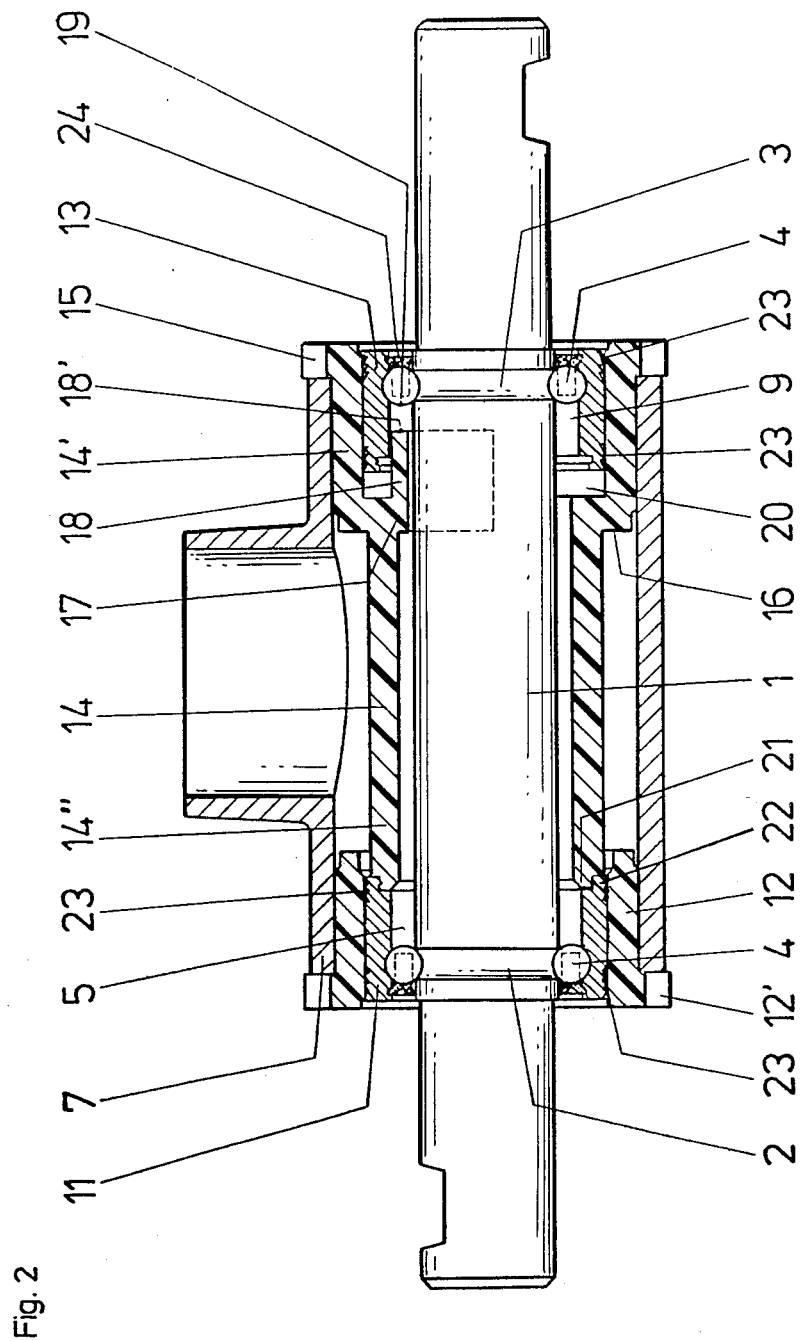
FIG. 2 shows a modified and preferred form of the structure of the present invention.

A preferred embodiment of the present invention is shown in FIG. 2. In FIG. 2, the inner races 2 and 3 for the balls 4 are appropriately spaced from each other on the shaft 1. The outer race ring 11 for the bearing 5 at the left in FIG. 2 is surrounded by the intermediate bushing 12 which has an axially outward radial flange 12'. The bushing 12 is force fit in the housing 7. The outer ring 13 of the right-hand bearing 9, which is mounted last, is surrounded by the larger diameter section 14' of the stepped bushing 14. The radial flange 15 for axial locking is located in the axially outer region of the stepped bushing 14. Within the area of the step 16 of the bushing 14, a radially inwardly directed segment 17 having an axially outwardly directed section 18 is provided in the shape of a partial ring. It is developed from and connected to the section 16 of the bushing 14. The section 18 serves to support the balls 4 when, in a preassembled condition, the face 18' of the section 18 is pushed in up to approximately the circular axially inward boundary 19 of the group of bearing balls 4. A similar ball loading operation is illustrated in U.S. Pat. No. 4,508,397. This pushing up of the face 18' becomes possible because of the gap 20 in the bushing 14 by means of which axial tolerances of other parts may be compensated for. The stepped bushing may be pushed up far enough that the outer ring 13 extends into the annular space between the large diameter section 14' and the ring 13.

On the other side of the bushing, within the region of the smaller diameter section 14', the end of the bushing 14 bears on the one hand against the axially inward face of the outer ring 11. The bushing 14 also has a resilient projection 21 which snaps into a cooperating groove 22 in the outer ring 11. By this means, a single structural unit is established. The teeth 23 are provided over different portions of the outer surfaces of the outer rings 11 and 13 to provide for interlocking with the bushings 12 and 14, respectively, to prevent relative axial movement.

Figure 3:
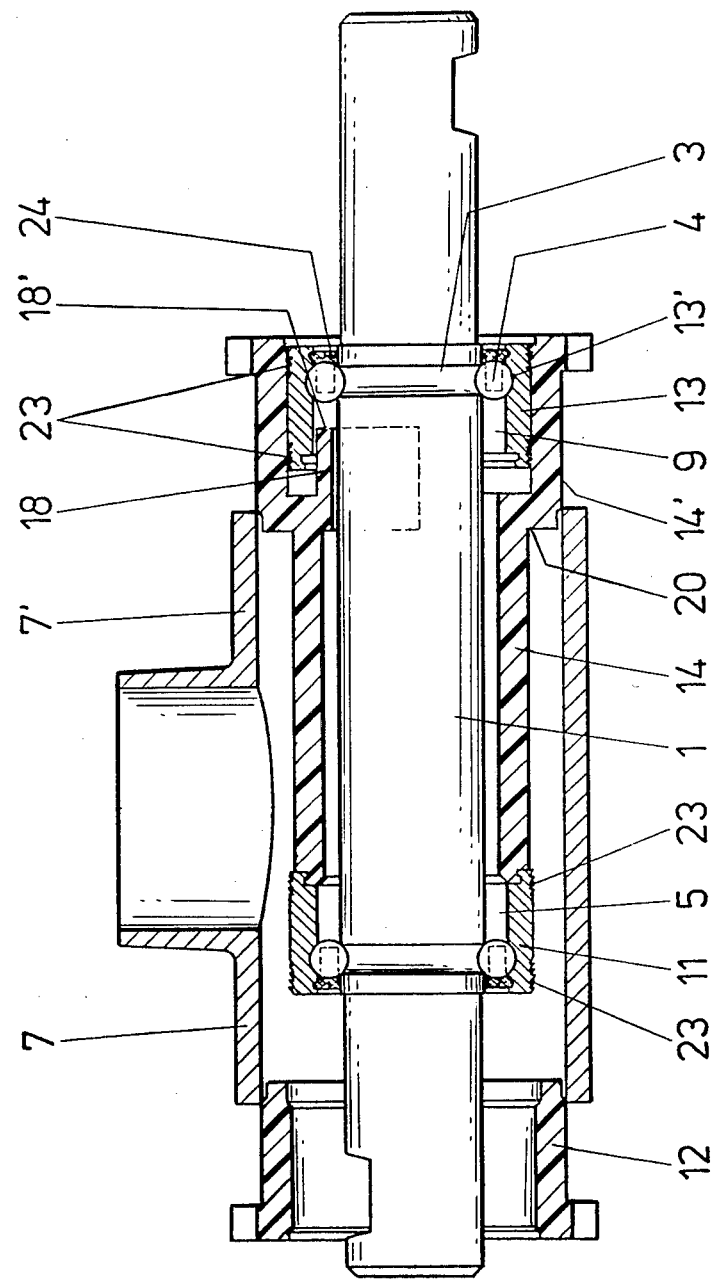
FIG. 3 is a view corresponding to that of FIG. 2 showing the partially assembled condition for the structure of FIG. 2.

The assembly of the bearings 5 and 9 and the fastening of bearings 5 and 9 in the housing 7 are clarified by FIG. 3 which shows the embodiment of FIG. 2 in a partially assembled state. While the shaft 1 is outside the housing 7, the bearing 5 is first mounted on the shaft 1 in the usual manner. The outer ring 13 is then pushed into the stepped bushing 14. This is possible since a clearance is present between the two parts. The outer ring 13 and the stepped bushing 14 are then placed on the shaft 1 in such manner that the inner and outer races 3 and 13' are opposite each other. At this stage, the outer ring 13 together with the stepped bushing 14 can be shifted eccentrically of the shaft 1. This makes it possible to introduce a large number of balls 4 into the crescent-shaped space which develops between the eccentric outer ring 13 and the shaft 1. The section 18 has the shape of a partial ring. The section 18 prevents the balls from falling into the inside when its face 18' has been pushed approximately up to the outer periphery of the assembled balls 4, as suggested in U.S. Pat. No. 4,508,397. This, too, is readily possible, owing to the gap 20 and the clearance between outer ring 13 and the stepped bushing 14.

After the balls have been loaded, the outer ring and the stepped bushing 14 are arranged concentrically with respect to the shaft 1, which distributes the balls 4 uniformly on the periphery of the shaft. Then the cage 24 is snapped into place. The stepped bushing 14 can be pushed relative to the outer ring 13 in the direction toward the outer ring 11, to the left in FIG. 3, and be forced into a unit with the ring 11 by means of the resilient projection 21 and the groove 22. The entire unit comprising shaft 1, bearings 5 and 9 and stepped bushing 14 is then pushed into the housing 7, as shown in FIG. 3.

There is a cutback between the section 14' of the stepped bushing and the section 7' of the housing. This means that the section 7' does not extend out axially as long as the section 14' of the bushing 14. Since this cutback is greater than the clearance between section 14' of the bushing and the outer ring 13, which means the interface between section 14' and ring 13 extends further axially than section 7', an axial locking of all parts, which is maintained during operation, is produced due to the radial deformation of the section 14'. Between the outer ring 13 and the section 14', additional locking is provided by the teeth 23 on the section 13 engaging the surface of the section of the stepped bushing 14.

As is also shown in FIG. 3, simultaneously with the insertion of the entire unit from the right-hand side of the housing 7, the intermediate bushing 12 can be introduced from the left. If the same type of cutback is present between the intermdiate bushing 12 and the housing 7 as well as the outer ring 11, that is, if the housing 7 is axially shorter than the bushing 12 and the ring 11, then good axial locking of the parts is also obtained here.

In order to simplify the positioning of the stepped bushing 14 and of the intermediate bushing 12, both are provided with respective radial flanges 12' and 15'. When these flanges abut against the respective faces of the housing 7 on each side the correct positions of the bushings have been reached.

Figure 4:
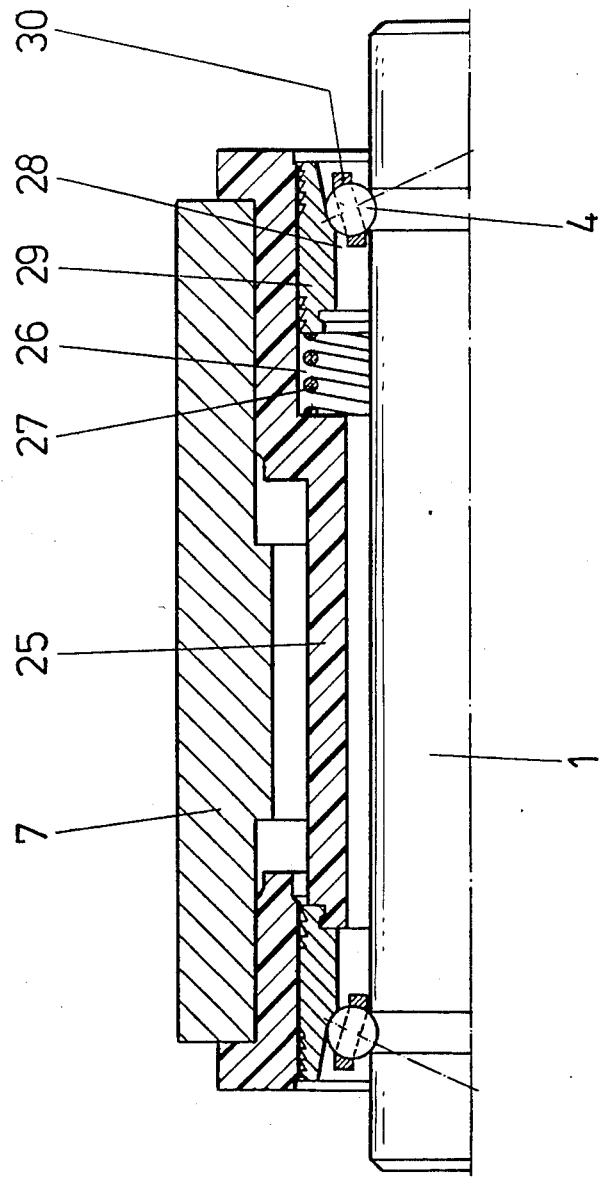
FIG. 4 is also a partial cross-sectional view of a further modified form of the present invention.

A somewhat modified embodiment is shown in FIG. 4. In this case, the stepped bushing 25 has a section with a wider inner diameter gap 26 within which a compression spring 27 is arranged. In this case, the use of an annular contact ball bearing 28 without an outer shoulder is possible. This makes it possible to provide the best possible filling of the bearing 28 with balls 4. Upon the introduction of the balls 4, it is merely necessary to shift the outer ring 29 axially against the spring 27 which is readily possible because of the clearance between the stepped bushing 25 and the outer ring 29 in the non-installed condition. When the balls 4 have been introduced and provided with cage 30, the outer ring 29 is in this example pushed back into the correct position by the compression spring 27.

In the foregoing, the present invention has been described solely in connection with preferred illustrative embodiments thereof. Since many variations and modifications of the present invention will now be obvious to those skilled in the art, it is preferred that the scope of the present invention be determined not by the specific disclosure contained herein, but only by the appended claims.

What is claimed is:

1. An anti-friction bearing unit for a housing which is disposable around a shaft, said bearing unit comprising:
   said housing being hollow so that said shaft may extend through said housing;
   a pair of anti-friction bearings spaced from each other along said shaft area; each said bearings comprising a pair of races, one of said races is an inner race locatable on said shaft; and an outer ring for each of said bearings; the outer race of each of said bearings being located on the outer ring for that said bearing; and
   a single piece hollow stepped relatively rigid bushing having a larger diameter section and having an opposite smaller diameter end section;
   said outer ring of one of said bearings being supported within the hollow of said bushing at said larger diameter end section of said bushing; said large diameter end section being supported within said housing;
   said outer ring of the other said bearings being supported within said housing; said smaller diameter end section of said bushing having an end extending up to and engaging the side of said outer ring of said other bearing.

2. The bearing of claim 1 wherein said other bearing is first to be mounted and said one bearing is mounted second.

3. The bearing of claim 2, wherein said bearings include ball bearings operating in said races.

4. The bearing of claim 1, wherein at and defining the step thereof, said stepped bushing has a radial wall extending from said smaller diameter section of said bushing to said larger diameter section of said bushing inside said larger diameter section of said bushing.

5. The bearing of claim 1, wherein said outer ring of said one bearing is spaced from said radial wall for defining a gap between them.

6. The bearing of claim 4, further comprising a compression spring in the region between said radial wall of said stepped bushing and said outer ring of said one bearing; said spring bearing against said radial wall and against said outer ring of said one bearing.

7. The bearing of claim 1, further comprising an intermediate bushing disposed around said smaller diameter section of said stepped bushing and in said housing.

8. The bearing of claim 7, further comprising a respective radially outwardly directed flange on the axially opposite, outward ends of said larger diameter section of said stepped bushing and on said intermediate bushing for respectively engaging the axially outward ends of said housing.

9. The bearing structure of claim 7, wherein the outer surface of said outer ring of at least one of said anti-friction bearings has teeth over at least a part of its length engaging a surface of its associated bushing.

10. An anti-friction bearing for a housing around a shaft, said bearing comprising:
    said housing being hollow and said shaft extending through said housing;
    a pair of anti-friction bearings spaced from each other along said shaft; each said bearing comprising a pair of races, one of said races is an inner race located on said shaft; and an outer ring for each of said bearings; the other outer race of each of said bearings being located on the outer ring for that said bearing;
    a hollow stepped bushing having a larger diameter end section and having an opposite smaller diameter end section;
    said outer ring of one of said bearings being supported within the hollow of said bushing at said larger diameter end section of said bushing; said larger diameter end section being supported within said housing;
    said outer ring of the other said bearing being supported within said housing; said smaller diameter end section of said bushing having an end extending up to and engaging the side of said outer ring of said other bearing; and
    a cutback between said larger diameter section of said stepped bushing and said housing, which is greater than the clearance between the inside of said stepped bushing and said outer ring of said one bearing, wherein said housing extends a first distance axially, and both said stepped bushing and said outer ring extending a greater distance axially.

11. An anti-friction bearing for a housing around a shaft, said bearing comprising:

said housing being hollow and said shaft extending through said housing;

a pair of anti-friction bearings spaced from each other along said shaft; each said bearing comprising a pair of races, one of said races is an inner race located on said shaft; and an outer ring for each of said bearings; the other outer race of each of said bearings being located on the outer ring for that said bearing; and a hollow stepped bushing having a larger diameter end section and having an opposite smaller diameter end section;

said outer ring of one of said bearings being supported within the hollow of said bushing at said larger diameter end section of said bushing; said larger diameter end section being supported within said housing;

said outer ring of the other said bearing being supported within said housing; said smaller diameter end section of said bushing having an end extending up to and engaging the side of said outer ring of said other bearing;

said stepped bushing having a radial wall at and defining the step thereof, extending from said smaller diameter section of said bushing to said larger diameter section of said bushing inside said larger diameter section of said bushing;

said stepped bushing includes an additional partially circumferential wall extending from said radial wall and spaced radially inwardly from said large diameter section of said bushing and said additional wall extending axially up to approximately said one bearing.

12. The bearing of claim 11, wherein said larger diameter section and said additional wall define an annular receptacle between them into which said outer ring for said one bearing extends.

13. An anti-friction bearing for a housing around a shaft, said bearing comprising:

said housing being hollow and said shaft extending through said housing;

a pair of anti-friction bearings spaced from each other along said shaft; each said bearing comprising a pair of races, one of said races is an inner race located on said shaft; and an outer ring for each of said bearings; the other outer race of each of said bearings being located on the outer ring for that said bearing; and a hollow stepped bushing having a larger diameter end section and having an opposite smaller diameter end section;

said outer ring of one of said bearings being supported within the hollow of said bushing at said larger diameter end section of said bushing; said larger diameter end section being supported within said housing;

said outer ring of the other said bearing being supported within said housing; said smaller diameter end section of said bushing having an end extending up to and engaging the side of said outer ring of said other bearing;

said stepped bushing having a radial wall at and defining the step thereof, extending from said smaller diameter section of said bushing to said larger diameter section of said bushing inside said larger diameter section of said bushing;

wherein a snap connection is provided between the outer ring of said other bearing and the end of the stepped bushing at said smaller diameter section.

14. The bearing structure of claim 13, wherein said snap connection comprises a groove in one of said outer ring of said other bearing and said bushing end and a resilient projection on the other of said outer ring and said bushing.

* * * * *